Sept. 15, 1931. K. J. WERSÄLL 1,823,074
CENTRIFUGAL FRICTION CLUTCH
Original Filed April 23, 1927

Inventor
Karl Johan Wersäll
by his Attorney

Patented Sept. 15, 1931

1,823,074

UNITED STATES PATENT OFFICE

KARL JOHAN WERSÄLL, OF STAMFORD, CONNECTICUT, ASSIGNOR TO AMERICAN KAMBI COMPANY, OF NEW YORK, N. Y., A CORPORATION OF DELAWARE

CENTRIFUGAL FRICTION CLUTCH

Original application filed April 23, 1927, Serial No. 185,962, and in Germany January 13, 1927. Divided and this application filed May 4, 1929. Serial No. 360,504.

This invention relates to centrifugal friction clutches in which the centrifugal friction bodies or shoes are actuated through the medium of a driver, and is a division of my pending application, Serial No. 185,962, filed April 23, 1927. To increase the wearing resistance of the clutch, it is very important that the maximal unit pressure in the friction surface should be reduced to the minimum. In all known prior constructions of clutches, the surface pressure is considerably greater at one end of the shoe,—generally at the front end of the same,—on account of the turning moment resulting from the driving power and the friction power tending to press the front end of the shoe with greater pressure against the track than the rear end.

According to the present invention, the required pressure distribution is obtained by insuring a turning moment of the shoe in the opposite direction, tending to lighten the pressure of the shoe at the front end. The result is obtained, in the present improvement, by constructing the contact surface between the driver and the friction shoe so that the generator of this surface in a plane at right angles to the shaft forms an acute angle with the tangent to the track surface at the point of intersection of said generator with said track surface, the point of said acute angle being directed in the direction of rotation of the clutch. With this construction the centrifugal force will act less on the foremost or leading part of the centrifugal friction body or shoe than on the rear or trailing part, since a component of the centrifugal force acting on the said body will be taken up by the inclined contact surface of the driver instead of being allowed to act radially and directly on the track surface of the clutch, as in prior known constructions. The generator of the contact surface between the driver and the centrifugal friction body may advantageously form an angle of from five to thirty degrees (5°–30°), with the radius through the outermost point of contact between the said body and the driver taken in a plane at right angles to the shaft.

In the drawings accompanying and forming a part of this specification—

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

Figure 1:
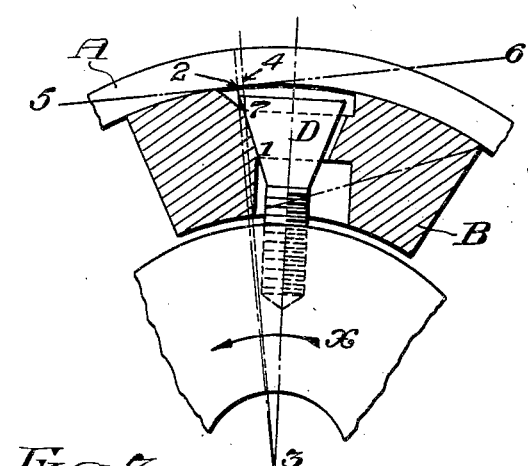
Figure 1 is a sectional view through a clutch at right angles to the shaft, with the contact surfaces of the driver and centrifugal friction body or shoe formed according to the present invention.

The driver D carried by a suitable shaft, in Fig. 1, is of frusto-conical form—and, therefore, wedge-shaped—with the smaller end of the wedge toward the center. 2—7—1 represents the plane of contact between the driver D and the centrifugal friction body or shoe B, the point 2 being the point of intersection of this plane with the friction surface of the track A. 2—3 is an imaginary radial line drawn from the point 2, and 5—6 represents the tangent to the friction surface of A at the point 2, while 4—7—3 is the radius drawn through the outermost contact point 7 between the driver D and the centrifugal body B. It will be observed that the angle 1—2—6 is an acute angle. When the driver D is rotated in the direction of the arrow $x$, the leading end of the centrifugal body will be drawn somewhat towards the center of the clutch on account of the angle 1—2—6, the point of which is directed in the direction of rotation, being less than a right angle. The generator and surface of contact form with the radius 4—7—3 an angle 1—7—3 of five to thirty degrees (5°-30°). Should a loose or protruding particle be present on the friction track and the centrifugal body or shoe slide onto it, said centrifugal body can position itself relatively to the track much more easily and glide over such particle when the foremost end of the body presses more lightly against the track than does the rear end thereof, and the track will wear much better than is the case with known constructions in which no provision is made for reducing the frictional contact pressure at the leading end of the centrifugal body or shoe.

Figure 2:
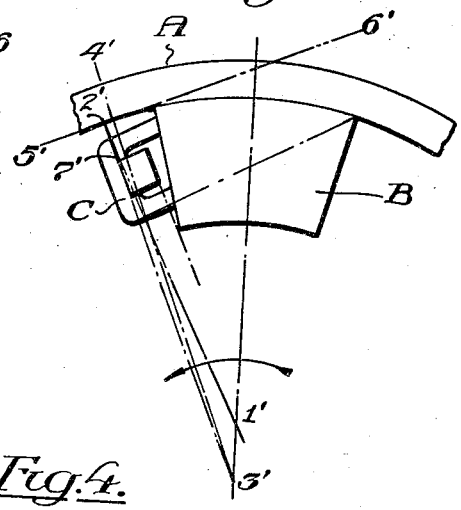
Fig. 2 is a side view showing the centrifugal friction body with the contact surface of the driver placed at the front end thereof.

In Fig. 2 the contact surface of the driver is placed at the front end of the centrifugal body or shoe against the stirrup C, with the contact surfaces lying on lines $2^1$—$7^1$—$1^1$. The line $5^1$—$6^1$ is the tangent to the track at the point $2^1$ and the angle $1^1$—$2^1$—$6^1$ is acute,—angle $1^1$—$7^1$—$3^1$ being chosen, as hereinbefore stated, in order to prevent undue wear on the friction surfaces of the track A and the centrifugal body B.

Figure 3:
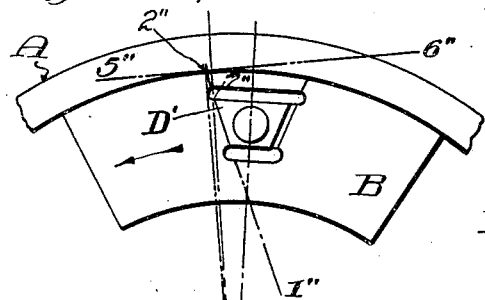
Fig. 3 shows an arrangement of a driver axially placed in the centrifugal friction body, the driver pin being fastened to the driver.
Figure 4:
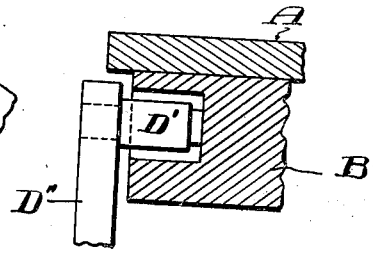
Fig. 4 is a cross-sectional view of the arrangement shown in Fig. 3.

In Figs. 3 and 4, with the driver pin D' fastened to the driver D", the angle 1"—7"—3" must be maintained within the above-mentioned limits of 5°-30°,—the angle 1"—2"—6", therefore, being also an acute angle.

Figure 5:
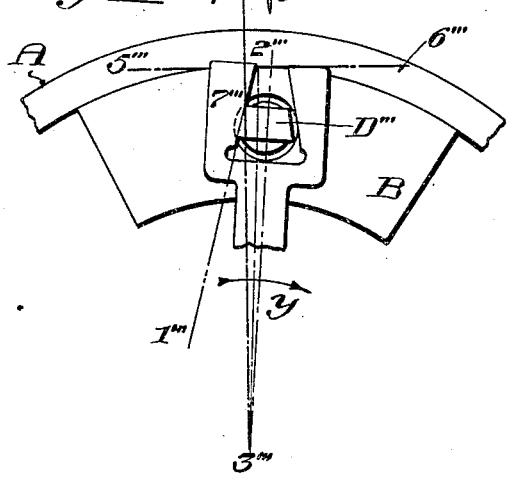
Fig. 5 is a view similar to Fig. 3 illustrating a modified arrangement wherein the driver pin is fastened to the centrifugal friction body.
Figure 6:
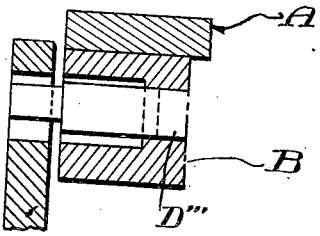
Fig. 6 is a cross-sectional view of the arrangement shown in Fig. 5.

In Figs. 5 and 6 the driver pin D''' is, as in Figs. 3 and 4, axially arranged, but is fixed on the centrifugal body. When the movement of the centrifugal bodies is to the right, as in the direction of the arrow $y$, the angle 1'''—2'''—3''' must be made 5°-30°,—or, in other words, the angle 1'''—2'''—5''', which the plane of driving contact makes with the tangent 5'''—6''' to the track at the point 2''' in a plane at right angles to the shaft, is acute and also has its point directed in the direction of the movement of the clutch.

It will be observed that in the present constructions the driver has contact with the shoe intermediate the front and rear ends of the shoe and consequently the shoe is not driven from the rear nor is it located in pockets of the driver.

Having now particularly described and ascertained the nature of my said invention and in what manner the same is to be performed, I declare that what I claim is:—

1. In a centrifugal friction clutch, the combination of a driven track member, a shaft-carried driver, and a shoe, the driver having contact with the shoe intermediate the front and rear ends of the shoe, the plane of the contact surface between the shoe and driver being so located with the tangent to the track that at the intersecting point thereof it forms an acute angle pointing in the direction of rotation.

2. In a centrifugal friction clutch, the combination of a driven track member, a shaft-carried driver, and a shoe, the driver having contact with the shoe intermediate the front and rear ends of the shoe, the plane of the contact surface between the shoe and driver being so located with the tangent to the track that at the intersecting point thereof it forms an acute angle pointing in the direction of rotation, such plane of contact also forming with a radial line from the shaft intersecting such intersecting point an acute angle.

3. In a centrifugal friction clutch, the combination of a driven track member, a shaft-carried driver, and a friction shoe, the driver having contact with the shoe intermediate the front and rear ends of the shoe, said shoe and driver having a surface therebetween arranged so that the generator of the contact surface between the driver and the friction shoe in a plane at right angles to the shaft forms an angle less than a right angle with the tangent to the track at the point of intersection of the generator with the same, the angle pointing in the direction of rotation.

4. In a centrifugal friction clutch, the combination of a driven track member, a shaft-carried driver, and a friction shoe, the driver having contact with the shoe intermediate the front and rear ends of the shoe, said shoe and driver having a frusto-conical surface therebetween arranged so that the generator of the contact surface between the driver and the friction shoe in a plane at right angles to the shaft forms an acute angle with the tangent to the track at the point of intersection of the generaor with the same, the angle pointing in the direction of rotation.

5. In a centrifugal friction clutch, the combination of a driven track member, a shaft-carried driver, and a friction shoe, the driver having contact with the shoe intermediate the front and rear ends of the shoe, said shoe and driver having a surface therebetween arranged so that the generator of the contact surface between the driver and the friction shoe in a plane at right angles to the shaft forms an acute angle with the tangent to the track at the point of intersection of the generator with the same, the angle pointing in the direction of rotation and the plane of such contact surface also forming with a radial line from the shaft intersecting such intersecting point an acute angle.

6. In a centrifugal friction clutch, the combination of a driven track member, a shaft-carried driver, and a shoe, the driver having contact with the shoe intermediate the front and rear ends of the shoe, said shoe and driver having a contact surface in a plane at right angles to the shaft forming an acute angle with the tangent to the track at the point of intersection of the plane of said contact surface with the track, with the angle pointing in the direction of rotation of the shoe, the plane of such contact surface forming with a radial line from the shaft and intersecting such point of intersection an acute angle.

7. In a centrifugal friction clutch, the combination of a driven track member, a shaft-carried driver, and a shoe, said shoe and driver having a contact surface in a plane at right angles to the shaft forming an acute angle with the tangent to the track at the point of intersection of the plane of said contact surface with the track, with the angle pointing in the direction of rotation of the shoe, the plane of such contact surface forming with a radial line from the shaft and intersecting such point of intersection an angle of from five to thirty degrees.

8. In a centrifugal friction clutch, the combination of a driven track member, a shaft-carried driver comprising a radially-located conically-shaped pin, and a shoe, said shoe and driver having a contact surface in a plane at right angles to the shaft forming an acute angle with the tangent to the track at the point of intersection of the plane of said contact surface with the track, with the angle pointing in the direction of rotation of the shoe, the plane of such contact surface forming with a radial line from the shaft and intersecting such point of intersection an angle of from five to thirty degrees.

Signed at Room 1822, 15 Park Row, New York, N. Y., this 3rd day of May, 1929.

KARL JOHAN WERSÄLL.